United States Patent [19]

Stokes, Jr. et al.

[11] 4,244,505
[45] Jan. 13, 1981

[54] RECOVERY OF FLUX RESIDUES FROM RINSE WATER IN DIP BRAZING

[75] Inventors: John J. Stokes, Jr., Murrysville; Robert A. Cargnel, Export; James H. Crooks, Apollo, all of Pa.

[73] Assignee: Aluminum Company of America, Pittsburgh, Pa.

[21] Appl. No.: 40,156

[22] Filed: May 17, 1979

[51] Int. Cl.$^3$ ............................................. B23K 1/08
[52] U.S. Cl. ................................ 228/223; 203/47; 210/652; 134/13; 75/93 AC
[58] Field of Search .............. 228/223, 242, 263 F; 203/47, 49; 148/26; 210/23 F, 23 H, 45, 70, 73 R; 75/24; 134/13

[56] References Cited

U.S. PATENT DOCUMENTS

| | | | |
|---|---|---|---|
| 2,327,065 | 8/1943 | Reimers | 148/26 |
| 2,396,604 | 3/1946 | Reimers | 148/26 |
| 2,569,097 | 9/1951 | Grange | 148/26 X |
| 2,688,402 | 9/1954 | Butterworth | 209/208 |
| 2,723,449 | 11/1955 | Miller | 148/26 X |
| 3,257,081 | 6/1966 | Brown et al. | 241/25 |
| 3,843,463 | 10/1974 | Brown | 203/89 X |
| 4,073,644 | 2/1978 | Papafingos et al. | 75/24 X |
| 4,188,291 | 2/1980 | Anderson | 210/23 H |

OTHER PUBLICATIONS

*Brazing Alcoa Aluminum*, Aluminum Company of America, Pittsburgh, Pennsylvania, 1955, pp. 51–55.

*Primary Examiner*—Kenneth J. Ramsey
*Attorney, Agent, or Firm*—Andrew Alexander

[57] ABSTRACT

A process for recovery of salts from a rinse liquid solution used to rinse salt flux from a metallurgical joining operation is disclosed in which process soluble flux salts are dissolved in the rinse liquid solution while other insoluble salts are dispersed therein. The process comprises collecting the rinse liquid solution; removing undissolved solids from the solution; concentrating the remaining solution by removal of liquid to provide a slurry; subjecting the slurry to a drying operation to remove the balance of the liquid; and recovering the residue. In a preferred embodiment, the residue is analyzed and sufficient metal salts are added to restore the residue to a desired salt flux composition for reuse.

8 Claims, 1 Drawing Figure

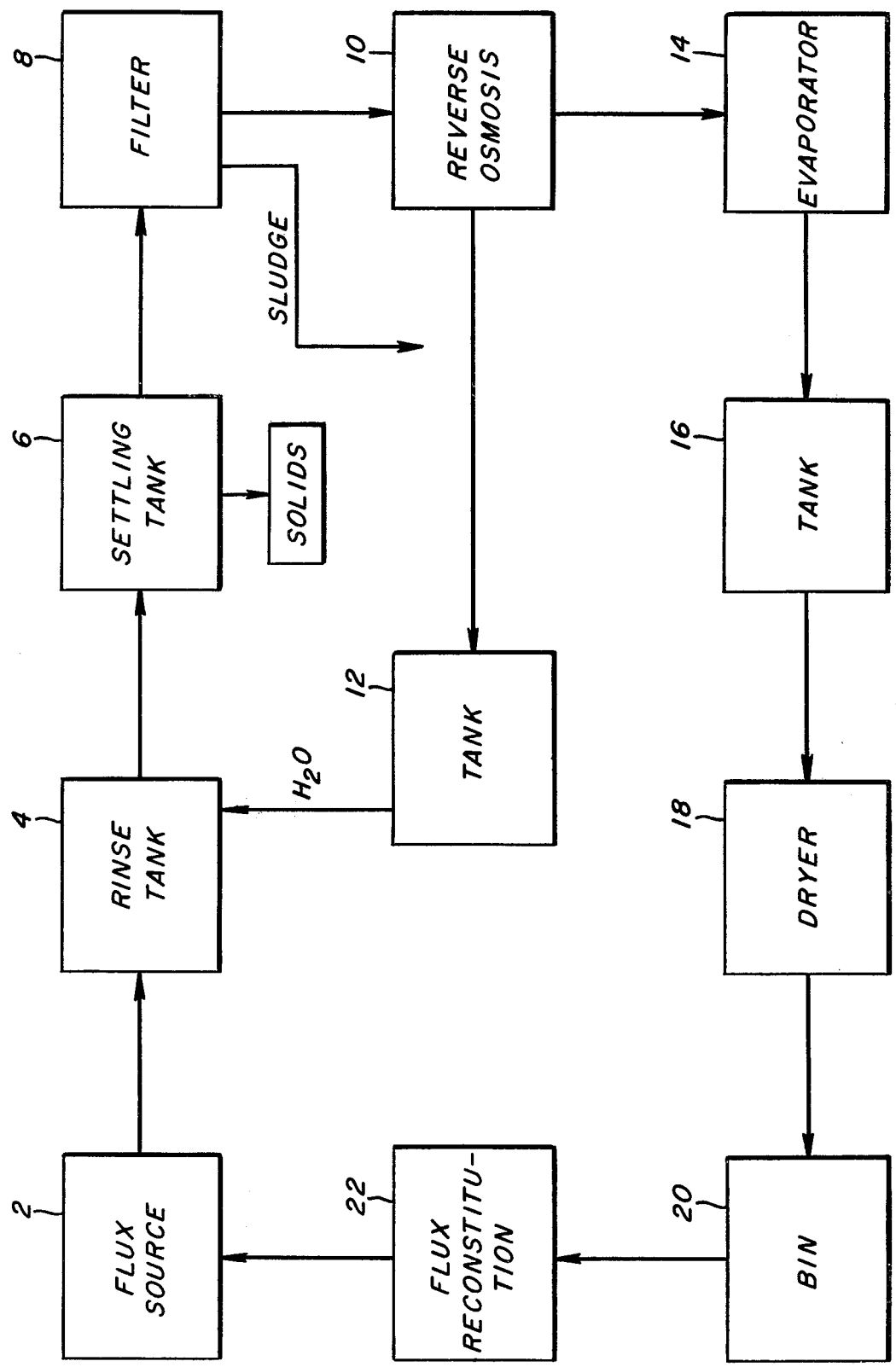

RECOVERY OF FLUX RESIDUES FROM RINSE WATER IN DIP BRAZING

BACKGROUND OF THE INVENTION

This invention relates to salt flux and more particularly it relates to recovery of salt flux from solutions of rinse liquids used in metallurgical joining operations such as brazing or welding of aluminum members.

In a typical metallurgical joining operation, the aluminum parts to be brazed are joined by an aluminum brazing filler metal, such as an aluminum-silicon alloy, having a melting point slightly below the aluminum members. Brazing is effected by heating the aluminum members to be joined and the filler metal to a temperature above the melting point of the latter, but short of the melting point of the former. The molten filler metal flows and forms a joining fillet between the aluminum metal members. Some diffusion between parent metal and filler metal occurs and the joint is considered, at least to some degree, to be metallurgically bonded.

Normally, an alkali metal halide salt flux is employed to overcome the oxide coating on the parent metal which allows the filler metal to wet and flow over the parent metal surfaces. This is considered necessary to obtain the capillary flow and uninterrupted fillet formation desired. In furnace brazing, the flux is applied as an aqueous flux suspension to the assembled parts which are dried prior to heating to brazing temperature. Typical flux suspensions contain 50% or more of the flux, and they deposit a substantial and easily visible amount of flux on the parts.

In dip brazing, the flux is substantially free of water and the joining operation takes place in the bath. However, in all of these processes, after the joining operation, residual flux salt is washed or rinsed away for purposes of preventing the residual flux salt from corroding the joined members. In the rinsing operation, conventionally, the rinse water is normally discarded when the flux salt dissolved therein reaches a certain level since, thereafter, rinsing is not efficient. Treating the rinse water in this way results in a substantial loss of salt flux which is an economic waste as well as an ecological problem. Thus, it can be seen that there is a great need for a system which is effective in recovering the salt flux from the rinse water. The present invention provides a highly economical system for recovering salt flux from the rinse water. Furthermore, the present invention eliminates any need to dump or discard the rinse water for reasons of its become ineffective. In addition, the invention can result in as much as an 80% reduction in the loss of salt flux.

SUMMARY OF THE INVENTION

An object of the present invention is to recover salt flux used in a metallurgical joining operation from rinse liquid.

Another object of the present invention is to minimize the amount of salt flux lost due to rinsing in a dip or furnace brazing operation.

Yet another object of the present invention is to substantially eliminate dumping of the rinse water in a brazing operation.

These and other objects will become apparent from an inspection of the drawing, specification and claims.

In accordance with these objects, there is provided a system for recovery of solids from a rinse liquid solution used to rinse salt flux from a metallurgical joining operation wherein soluble flux salts are dissolved in the rinse solution while other insoluble salts are dispersed therein. The system comprises the steps of collecting the rinse liquid solution; removing undissolved solids therefrom; and concentrating the remaining solution by removal of liquid to a slurry containing at least 30 wt.% solids. The slurry is then subjected to a drying operation to remove the balance of the liquid, and the residue is recovered. Operation of the system in accordance with the invention can result in as much as 80 wt.% of the flux removed in the rinse being recovered. In a preferred embodiment, the residue is analyzed and sufficient metal salts are added to restore the residue to a desired salt flux composition for reuse. Thus, the amount of metal salt required to maintain the flux in active condition is lowered considerably.

DESCRIPTION OF THE INVENTION

Referring now to the flow chart, box 2 (labelled "Flux Source") may be a brazed or welded article having flux residues remaining thereon. Typically, the amount of flux residue remaining on the brazed article is on the order of about 0.5 ozs/ft$^2$ aluminum. Although the amount can increase in the case of aluminum radiators, for example, where, because of the fins substantial capillary action can be encountered. On the basis of pounds of aluminum brazed, the amount of flux removed from the flux bath, which in turn is removed by the rinse, is on the order of about 0.2 lbs/lb of aluminum. It will be appreciated that this amount can vary. While these numbers are provided to demonstrate the brazing process, they also provide some indication of the amount of flux lost in the rinsing process and the economic benefits to be derived from the instant process. Further, any problems with respect to dispersion of the rinse water are virtually eliminated from an environmental viewpoint. Rinse liquid such as water from rinse tank 4 is applied to rinse the flux from the article. The water may be applied by spraying or dipping, and while only one tank is represented, there may be a number of tanks having increasing purity with respect to the water. The flux salts are then either dissolved into the rinse water, or suspended or dispersed therein if they are insoluble. It should be recognized here that the rinse liquid will most probably consist of ordinary water although other liquids, such as dilute acids, could be used. Furthermore, while ordinary tap water can be used, it may be preferable to provide some acidity in the water such as by the addition of nitric acid to aid in dissolution of particular flux salts. Typically, the pH is not normally lower than 2.0 and is generally maintained in the range of about 2.5 to 3.5.

The rinse liquid may be applied continuously until the accumulation of dissolved and suspended salts interferes with satisfactory rinsing, or, alternatively, a portion of the rinse liquid may be continuously withdrawn for processing in accordance with the invention.

The rinse liquid to be processed is transferred to settling tank 6 where undissolved salts are permitted to settle out. The supernatant liquid is then passed through filter 8 which removes most of the remaining suspended solids as sludge as shown in the flow sheet. It will be understood that any of these steps may be performed on a continuous basis.

The filtered liquid is then subjected to one or more steps to concentrate the liquid for eventual recovery of the dissolved salts therein. As shown in the flow chart, the filtered liquid may optionally be put through a reverse osmosis stage wherein the solution of rinse liquid and dissolved salts is concentrated while purified liquid, e.g. water, is removed and may be recycled back to rinse tank 4 via holding tank 12.

The filtered liquid is then subjected to an evaporation step 14, which, as alluded to above, may be used either in place of or as a supplement to the reverse osmosis step. Evaporation step 14, at its simplest, may comprise an open vessel to which heat is applied, whereby the liquid, e.g. water, boils off leaving the salt residue behind. That is, the purified water is not collected. The evaporation step may comprise a more sophisticated apparatus where the liquid is not only removed from the salt residue but is collected and recycled back to rinse tank 4. Such a system is referred to as the Alcoa Thermopure System, which is described and claimed in Brown U.S. Pat. No. 3,843,463, issued Oct. 22, 1974, and incorporated herein by reference. In the evaporative step, the salts should not be concentrated to provide a slurry having greater than about 50 wt.% solids, and perferably, the solids should not be concentrated to a level greater than 30 wt.% in order to avoid interferring with operation of the system.

The evaporated slurry or residue may then be removed from the evaporator 14 and placed in a holding tank 16 prior to placement in dryer 18 wherein the residue is heated to a temperature sufficient to remove a substantial amount of liquid, e.g. water. This may be accomplished by heating it to a temperature of about 110° to 150° C. for about 30 minutes. If it is desired to use the salts in the flux bath again, then the water content remaining therein should not be greater than 0.5 wt.% and preferably not greater than 0.3 wt.%. It is very important that the water level be carefully controlled to avoid introduction of water to the flux bath where it can operate to oxidize the aluminum surface as opposed to removing the oxide therefrom.

The dried salts removed from the dryer at 20 are preferably disposed of by recycling for further use as flux agents. For recycling at 22, the residue is analyzed to determine the chamical balance of the constituents to determine what salts have been lost during the process. Sufficient additional salts are then added to provide the desired concentration and ratios of salts.

It should be noted here that the term "salts" as used herein is used in a broad sense to encompass not only metal halides, but other metal compounds encountered in the rinse water.

The invention is most effective when the flux ingredients are recycled and reconstituted by the addition of makeup ingredients for those lost and is most useful when a flux is used, the salts of which are soluble in the rinse water. The loss of some flux ingredients is not simply due to inefficient recovery procedures, but may be due to chemical conversions occurring during application and usage of the flux wherein soluble flux ingredients interact to form insoluble compounds or react with the oxides on the metals to be metallurgically joined together to form insoluble residues.

For example, the present invention is not intended for use with fluxes comprising the fluoride type salts, such as the soduim, potassium, calcuim fluorides or cryolite salts. That is, the system is not intended to recover these types of salts from water. Rather the present invention is intended to be used to recover fluxes whose constituents are to a large extent soluble in the rinse water.

For example, the joining of aluminum or aluminum alloy parts by dip brazing involves the use of a molten combination of halides, including alkali metal chlorides, such as LiCl, NaCl and KCl as well as alkaline earth chlorides, such as $CaCl_2$ with metal fluorides such as $AlF_3$, NaF or the like. The use of NaF in such a combination has been found to result in the formation of $CaF_2$ residue which is not soluble in the rinse water, and, therefore, such flux would normally not be considered suitable for use with the present invention. The $CaF_2$ residue forms in the flux when it is held in a molten condition for an extended period of time, i.e. over 24 hours. In contrast, the system of the invention has been found to function well with the use of a $CaCl_2$, NaCl, KCl and $AlF_3$ flux wherein the chloride component is controlled to 27.5 to 32.0 wt.% $CaCl_2$, 13.5 to 22.0 wt.% NaCl and 39.2 to 51.0 wt.% KCl and $AlF_3$ is added to constitute 5 to 8 wt.% of the total flux (described and claimed in copending application Ser. No. 40,157, entitled Dip Brazing Flux). Other fluorides which may be used alone or in conjunction with $AlF_3$ include soduim, potassium and lithium florides. In the use of the aforesaid flux in the joining together of aluminum alloy members, the flux ingredients dissolve in the rinse water while insoluble materials such as $Al_2O_3$ are removed in the initial settling. The flux can then be recycled for use by addition of sufficient makeup salts to restore the salts in condition suitable for adding to the flux bath.

The following examples are further illustrative of the invention.

EXAMPLE 1

An aluminum flux bath was made up comprising, by weight, 28.81% NaCl, 48.36% KCl, 16.28% LiCl and 6.55% $AlF_3$ and aluminum assemblies were brazed therein at a temperature of 602° C. The assemblies used a base plate of #23 brazing alloy (Aluminum Association designation) and aluminum members of 3003 alloy (Aluminum Association designation) which were joined during the brazing operation. The brazed assemblies were then rinsed in deionized water at room temperature. The rinse water, which contained about 3 wt. % soluble compounds, was first filtered to remove insoluble compounds, such as $Al_2O_3$ and insoluble fluorides, and then treated in accordance with the Thermopure process (referred to earlier) and the soluble salts were concentrated to about 30 wt. %. The salt slurry was dried in an oven at a temperature of 125° C. The water content thereof was about 0.5 wt. %. The dried salts were then analyzed and reconstituted by adding thereto 6.90 gms KCl, 1.66 gms NaCl, 0.00 gms LiCl and 7.55 gms $AlF_3$, which was addition of 16.11 gms of new salts per 100 gms of recovered salt. Thus, using the reconstituted salt which had a composition, by weight, of about 50.5% KCl, 28.0% NaCl, 15.0% LiCl and 6.5% $AlF_3$, assemblies, as mentioned before, were brazed and braze fillets which were found to be essentially complete, e.g. greater than 90%. Using an aluminum base plate of #23 alloy, the fillets were 100% complete for three samples. This compared very favorably with assemblies brazed in the original flux where the fillets were 88.7% complete for #11 alloy and 96.3 complete for #23 alloy.

EXAMPLE 2

An aluminum flux brazing bath was made up containing, by weight, 31.5% $CaCl_2$, 17.9% NaCl, 44.1% KCl and 6.5% $AlF_3$ and assemblies were brazed therein as in Example 1. Also, the rinse water used was collected and treated as in Example 1. The dried sample was analyzed. 18.74 gms of a mixture containing 37.0% $CaCl_2$, 21.9% KCl and 41.1% $AlF_3$ were added to each 100 gms of the recovered salts to provide a flux composition substantially the same as the starting composition. The reconstituted flux was used for brazing assemblies as in the original bath. It was found that using #23 alloy as the base plate, 100% fillets were obtained and using #11 alloy as the base plate, 85% or better fillets were obtained which compared very favorably with fillets obtained in the original bath.

EXAMPLE 3

An aluminum flux brazing bath containing, by weight, 23.0% $CaCl_2$, 49.0% KCl, 17.7% NaCl, 6.1% LiCl, 1.9% $AlF_3$ and 2.3% $NaF_3$ was used to braze assemblies as referred to in Example 1. High quality fillets were obtained with 90% or more of the joint being brazed. The assemblies were rinsed and the rinse water treated to recover the dissolved salts. The dried salts obtained were analyzed and 46 gms of a mixture containing 15.1% $CuCl_2$, 20.5% KCl, 30.0% LiCl, 2.2% $AlF_3$ and 3.2% NaF was added to every 100 gms of dried salts to return the flux to what was believed was the original composition. The flux was then used for brazing assemblies as above. However, only about 20% of the joint area had been brazed, and it was found that the samples had become badly discolored. The reasons for the failure of the flux in this example are not fully understood but it is believed that a compound such as $CaCl_2.Ca(OH)_2$ is formed which is not believed to be formed in the aforementioned examples. It is believed that such compound does not undergo ionization in the molten flux to form chloride ionic species and thus acts to inhibit the brazing action.

These examples demonstrate that flux salts can be recovered from rinse water and can be returned to a state whee they can be reused in a salt flux thereby greatly conserving the amount of salt required for the flux.

While the invention has been described with respect to certain embodiments, other modifications will be apparent to those skilled in the art which are within the scope of the invention, as defined in the appended claims.

What is claimed is:

1. A process for recovery of fluxing salts from a rinse liquid solution used to rinse salt flux from an aluminum joining operation wherein soluble flux salts are dissolved in the rinse liquid while other insoluble salts are dispersed therein which comprises:
   (a) providing a salt flux for joining an assembly of aluminum members;
   (b) submerging the assembly in the salt flux;
   (c) removing the assembly from the flux and treating it with rinse liquid to remove flux adhering thereto;
   (d) collecting rinse liquid solution;
   (e) removing undissolved solids from the solution;
   (f) concentrating the remaining solution by removal of liquid;
   (g) drying the concentrated solution;
   (h) recovering a salt residue from the concentrated solution;
   (i) analyzing the salt residue and adding flux salt to provide a reconstituted residue suitable for use with the original salt flux;
   (j) adding the reconstituted salt flux to the original salt flux; and
   (k) brazing aluminum assemblies therein and obtaining high quality brazed joints in said assemblies.

2. The process according to claim 1 wherein the flux contains metal chlorides and metal fluorides, the amount of fluoride present in the flux being controlled so that the salts have a high solubility in the rinse water.

3. The process according to claim 1 wherein the dip brazing flux contains $CaCl_2$, NaCl, KCl and at least one metal fluoride selected from the group consisting of sodium, potassium, lithium and aluminum fluoride and is characterized by a low formation of $CaF_2$ when the flux is maintained in a molten condition for an extended period of time.

4. The process according to claim 3 wherein the amount of $CaF_2$ formed is not greater than about 5.0 wt.% of the flux.

5. The process according to claim 3 wherein the flux contains aluminum fluoride.

6. The process according to claim 1 wherein the flux contains 13.5 to 22.0 wt.% NaCl, 39.2 to 51.0 wt.% KCl and 27.5 to 32.0 wt.% $CaCl_2$ based on the chloride component.

7. A process for recovering flux salts from a rinse solution used for rinsing salt flux from aluminum members joined in a dip brazing operation, the process comprising the steps of:
   (a) providing a molten flux containing NaCl, KCl, $CaCl_2$ and at least one fluoride salt selected from the group consisting of sodium, potassium, lithium and aluminum fluoride, the flux characterized by formation of not greater than 5.0 wt.% $CaF_2$ after standing for a period of 8 hours in the molten condition;
   (b) dipping the aluminum members therein for joining;
   (c) on removal of said members from the flux, treating them with rinse solution to remove residual flux adhering thereto;
   (d) collecting the rinse water and removing undissolved solids therefrom;
   (e) concentrating the dissolved salts by removal of liquid to provide a slurry having not greater than 50 wt.% solids;
   (f) subjecting the concentrated salts to a drying action to provide salts having a liquid content not greater than 0.5 wt.%; and
   (g) analyzing said dried salts and adjusting the composition thereof for use in the molten flux.

8. A process for recovering flux salts from a rinse solution used for rinsing salt flux from aluminum members joined in a dip brazing operation, the process comprising the steps of:
   (a) providing a molten flux containing NaCl, KCl, $CaCl_2$ and at least one fluoride salt selected from the group consisting of sodium, potassium, lithium and aluminum fluoride, the flux characterized by formation of not greater than 5.0 wt.% $CaF_2$ after standing for a period of 8 hours in the molten condition;
   (b) dipping the aluminum members therein for joining;
   (c) on removal of said members from the flux, treating them with rinse solution to remove residual flux adhering thereto;
   (d) collecting the rinse water and removing undissolved solids therefrom;

(e) concentrating the dissolved salts by removal of liquid to provide a slurry having not greater than 50 wt.% solids;
(f) subjecting the concentrated salts to a drying action to provide salts having a liquid content not greater than 0.5 wt.%;
(g) analyzing said dried salts and adjusting the composition thereof for use in the molten flux; and
(h) adding the adjusted salt flux to the original molten flux and brazing aluminum members therein to obtain high quality brazed joints therebetween.

* * * * *